United States Patent
Bell, Jr.

[11] 4,127,817
[45] Nov. 28, 1978

[54] TRANSMITTER DETECTING APPARATUS

[75] Inventor: Allan D. Bell, Jr., Annandale, Va.

[73] Assignee: Dektor Counterintelligence & Security, Inc., Springfield, Va.

[21] Appl. No.: 697,107

[22] Filed: Jun. 17, 1976

[51] Int. Cl.² .................................................. H04B 1/00
[52] U.S. Cl. ........................................ 325/364; 307/358
[58] Field of Search ................. 325/29, 31, 67, 133, 325/134, 363, 364; 343/18E; 307/235 R, 235 J, 350, 351, 358; 324/79 R, 83 FE, 118, 144

[56] References Cited
U.S. PATENT DOCUMENTS

| | | | |
|---|---|---|---|
| 3,473,127 | 10/1969 | Williams et al. | 325/364 |
| 3,882,272 | 5/1975 | Norian | 325/364 X |
| 3,939,420 | 2/1976 | Risberg et al. | 325/67 |
| 3,940,699 | 2/1976 | Emgushov | 325/364 X |
| 3,990,011 | 11/1976 | Knight | 325/133 |

Primary Examiner—Robert L. Griffin
Assistant Examiner—Aristotelis M. Psitos
Attorney, Agent, or Firm—Roylance, Abrams, Berdo & Farley

[57] ABSTRACT

An eavesdropping device having a microphone and a transmitter is detected by an apparatus including an antenna, a broad-band detector, a limiter-amplifier, and a loudspeaker. The apparatus establishes a regenerative feedback loop with the eavesdropping device and produces a revealing tone. The limiting amplifier shifts the level of the demodulated signal and amplifies all but a peak portion, and combines the signal thus limited with an unmodified signal in a differential amplifier, thus amplifying the peak portion, thus preventing amplifier saturation in an environment having interfering signals which are stronger than the signals transmitted by the eavesdropping device. Cascaded limiting amplifier stages can be used.

6 Claims, 4 Drawing Figures

TRANSMITTER DETECTING APPARATUS

This invention relates to an apparatus for detecting and indicating the presence of an eavesdropping device.

BACKGROUND OF THE INVENTION

In the espionage field, it is common practice to employ eavesdropping devices which are capable of responding to sound waves within a room, modulating a carrier with the sound waves, and transmitting a modulated RF signal which can be received at a location spaced from the room and monitored. Such eavesdropping devices are commonly quite small so that they can be easily concealed in a room and, generally, produce a relatively weak transmitted electromagnetic energy signal, the power level and, therefore, the range of transmission being determined by the proximity of the monitoring receiver. The power level of the transmitted signal can be as low as, for exampled, 500 microwatts. In addition, such transmitters are normally battery powered and can be remotely activated so that they remain dormant most of the time and are activated only when an operator at the monitoring location wishes to listen to events occurring within the room containing the device.

Except for the possibility of a physical search, it is difficult to determine the presence of such an eavesdropping device. While a physical search can be conducted, such a search is difficult and time consuming and may not reveal a transmitter which has been embedded in a wall or in some piece of furniture or appliance within the room and which has been permitted to remain dormant for an extended interval. Thus, it is desirable to be able to periodically or continuously investigate a room to determine the presence of operating eavesdropping devices without the necessity of conducting a physical search of the location upon each such occasion.

One phenomenon which can be employed, and which has been recognized as being usable for this purpose, is the regeneration phenomenon. It is well known that if the signal transmitted by the eavesdroppong device is received and demodulated and if the demodulated signal is then propagated in the form of acoustic energy within the room, the eavesdropping device will receive that acoustic energy, along with other sound in the room, and retransmit a signal modulated therewith, forming a regenerative feedback loop which results in a characteristic tone, most often a squeal, which reveals the presence of the device whereupon it can be located and removed. An example of a system of this type is shown in U.S. Pat. No. 3,473,127, Williams et al.

However, there are certain difficulties inherent in the use of this approach. One such difficulty is that the frequency of the carrier used by the eavesdropping transmitter is unknown. While, as a practical matter, the general range of frequencies over a rather broad spectrum can be determined, it is necessary to use a rather broad-band detector and broad-band amplifiers, or else to use the technique of sweeping through a wide spectrum of frequencies, hoping that the frequency used by the eavesdropping device will be encountered for a sufficiently long time to establish the regenerative feedback loop. The "spectrum sweeping" approach has been found to have substantial shortcomings in view of the very low power of the eavesdropping transmitter and the need to tune the sweeping device to the transmitter frequency for some finite interval in order to establish the loop. The broad-band detector and amplifier approach is, therefore, somewhat more desirable, but has a further disadvantage. This disadvantage has to do with the existence of radio or other noise signals from various sources, which interfering signals may be of a much greater power level than the signal produced by the eavesdropping transmitter. Indeed, the signal from a relatively close broadcast transmitter can exceed the eavesdropping transmitter power by many multiples. Thus, any broad-band detector and amplifier having sufficient gain to reproduce the eavesdropping transmitter's signal will saturate and become useless in the presence of such interfering signals, rendering the system inoperative.

It will further be recognized that the system must operate quickly so that an operator at the monitoring station will not become aware of efforts to detect the eavesdropping transmitter, giving him an opportunity to deactivate it.

SUMMARY OF THE INVENTION

Accordingly, an object of the present invention is to provide an apparatus for detecting an eavesdropping device which is not subject to saturation in the presence of interfering signals.

A further object is to provide an eavesdropping transmitter detecting device capable of operating repetitively or continuously and of immediately indicating the presence of an eavesdropping transmitter.

A further object is to provide an eavesdropping transmitter detecting apparatus having a limiting amplifier capable of rejecting interfering signals while amplifying signals of a desired type.

Briefly described, the apparatus includes antenna means for receiving electromagnetic signals, broadband detector means for demodulating signals received by the antenna means, amplifier circuit means for amplifying only selected portions of the signals demodulated by the detector means, and transducer means for converting the selected portions to acoustic signals and for propagating the acoustic signals for reception by the eavesdropping device to establish a regenerative loop, the presence of the device being manifested by a perceptible tone from the transducer means. The amplifier circuit means includes means for establishing a reference level for the demodulated signal at a predetermined voltage difference from one peak of the signal, means for amplifying the portion of the signal not between the reference level and the peak, a differential amplifier, first circuit means for coupling the amplified portion of the signal to one input of the differential amplifier, and second circuit means for coupling the demodulated signal to the other input of the differential amplifier, whereby the differential amplifier amplifies that portion of the signal between the reference level and the peak, which portion includes the signal from the eavesdropping transmitter.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
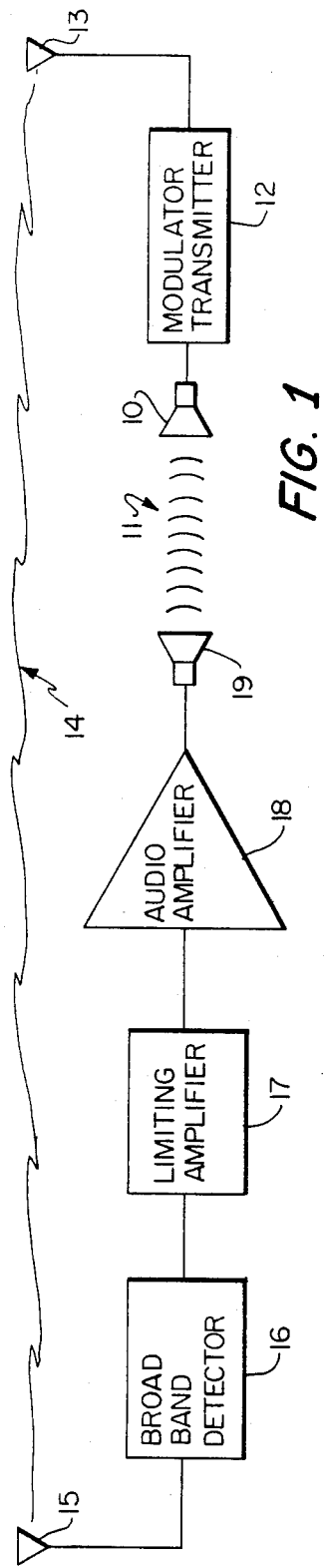
FIG. 1 is a schematic diagram, in block form, of an eavesdropping device and an apparatus according to the invention for establishing a regenerative loop with the device.

As indicated in FIG. 1, the eavesdropping device itself includes a microphone 10 for receiving acoustic energy 11 within a space being surveyed by the eavesdropping device, and a modulator-transmitter 12 for modulating a carrier signal with signals representative of the acoustic energy received by microphone 10. The modulated signal is then transmitted by an antenna 13, the intention being to receive the electromagnetic radiation therefrom at a monitoring location geographically separated from the eavesdropping device. The modulator-transmitter 12, the microphone 10, and the antenna 13 can take many forms, as can the nature of the transmission itself. The specific frequency of the carrier to be used therein is substantially unpredictable and must be regarded as an unknown, but these characteristics are of no particular consequence insofar as the apparatus of the present invention is concerned. They are accepted as limiting criteria of the system design and are dealt with accordingly.

In the detection apparatus, the electromagnetic energy indicated generally at 14, radiated by antenna 13 is received by an antenna 15 and coupled to a broad-band detector 16 which can be a simple diode detector of conventional type. The demodulated signal from detector 16 is provided to the input of at least one limiting amplifier stage 17 wherein a selected portion of the demodulated signal is amplified and provided to a conventional audio amplifier 18 which amplifies the audio frequency signals and drives a conventional loudspeaker 19. The acoustic energy 11 produced thereby is received by microphone 10, completing the loop.

As previously indicated, the electromagnetic energy received by antenna 15 can include, in addition to the signals radiated by antenna 13, other signals at various frequencies produced by electrical equipment, broadcast or other transmitting stations or the like. Such signals can be, and frequently are, of greater power than the signal produced by the eavesdropping transmitter. The demodulated signal emanating from detector 16 is therefore likely to be a composite signal of various frequencies which are within the operative range of the detector and amplifier but are otherwise unpredictable. Because of the relatively small power of the eavesdropping transmitter signal, that signal must be amplified significantly in order to produce sufficient acoustic energy to establish feedback regeneration. If the signal is simply amplified in its composite form, without any other processing, the stages of amplification would quickly saturate, rendering the apparatus useless. The manner in which this problem is overcome will be described with reference to FIG. 2.

Figure 2:
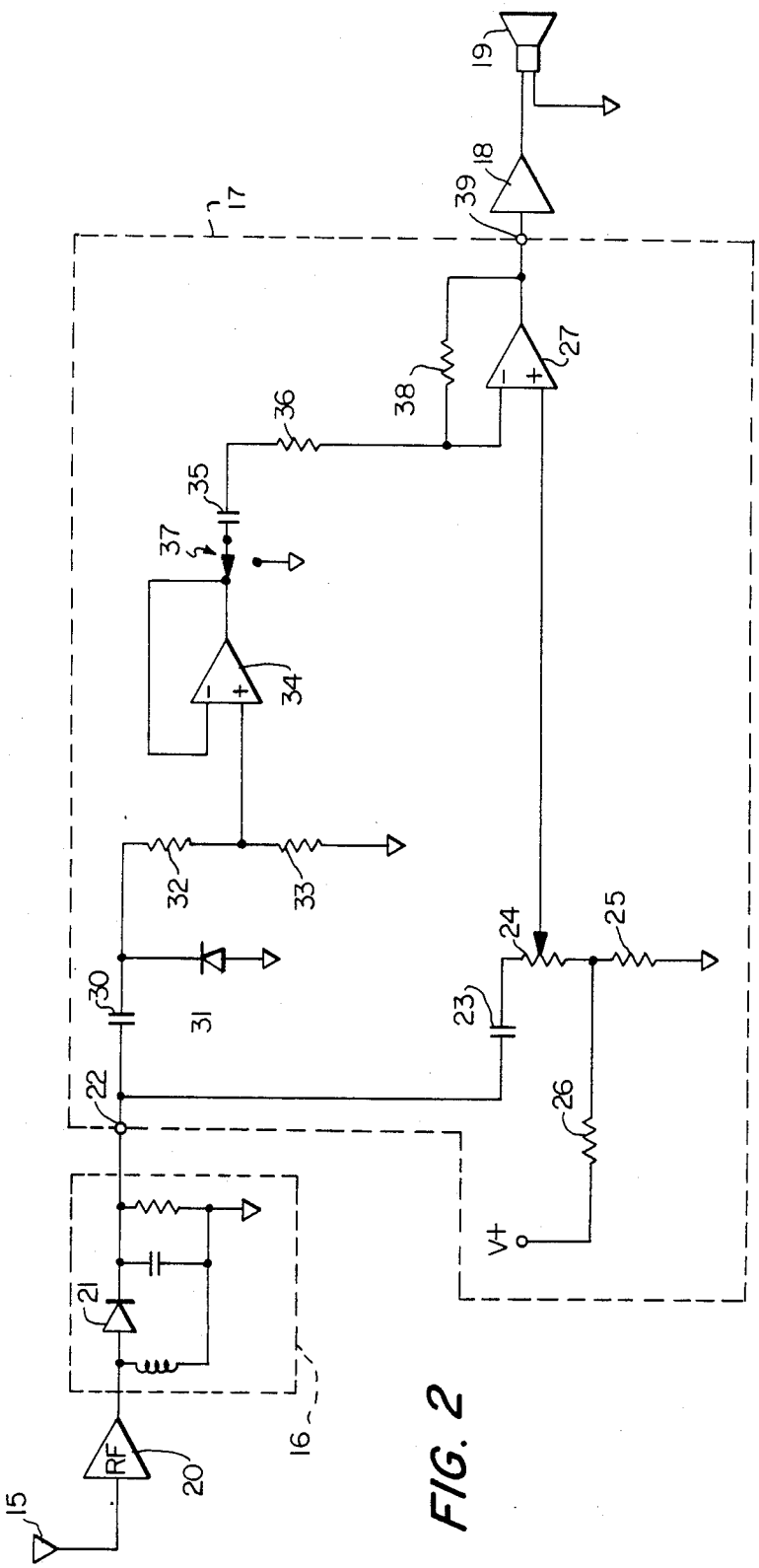
FIG. 2 is a schematic diagram, partly in block form, of a limiting amplifier according to the present invention.

As shown in FIG. 2, the composite signal received by antenna 15 is amplified by an RF amplifier 20 of conventional nature, this amplifier being included to boost the signal levels by about 12 db, for example, to assure that very low signals are of sufficiently large magnitude to be effectively detected by the detector stage. The signal is then detected by detector 16 which can include, as shown in FIG. 2, a diode 21. The output from detector 16 is provided to the input terminal 22 of limiting amplifier 17.

The demodulated signal is coupled through a capacitor 23 to a voltage divider and bias circuit including a potentiometer 24, having a resistive element and a movable wiper, the resisitive element being connected in series with a fixed resistor 25 and circuit ground. A bias resistor 26 is connected between a positive dc voltage supply V+ and the junction between the potentiometer 24 and fixed resistor 25. The movable wiper of potentiometer 24 is connected to the non-inverting input of a differential amplifier 27.

The demodulated signal is also coupled through a capacitor 30 to the cathode of a conventional silicon diode 31, the anode of which is connected to circuit ground. Silicon diode 31 exhibits a voltage drop of approximately 0.6 volts and functions, in conjunction with the other circuit elements, to establish a circuit ground reference level about 0.6 volts from the negative peak of the signal. Fixed resistors 32 and 33 are connected in series circuit relationship with each other and in parallel circuit relationship with diode 31. The junction between resistors 32 and 33 is connected to the non-inverting input of a conventional operational amplifier 34. The output of amplifier 34 is connected in a well-known manner to its inverting or reference input, producing a unity gain, non-inverting operational amplifier. The output of amplifier 34 is also coupled through a two-position switch 37, the function of which wll be described hereinafter, a capacitor 35 and a series fixed resistor 36 to the inverting input of differential amplifier 27. A fixed resistor 38 is connected between the output of amplifier 27 and its inverting input. The output of amplifier 27 is connected to audio amplifier 18 which drives loudspeaker 19.

Figure 4:
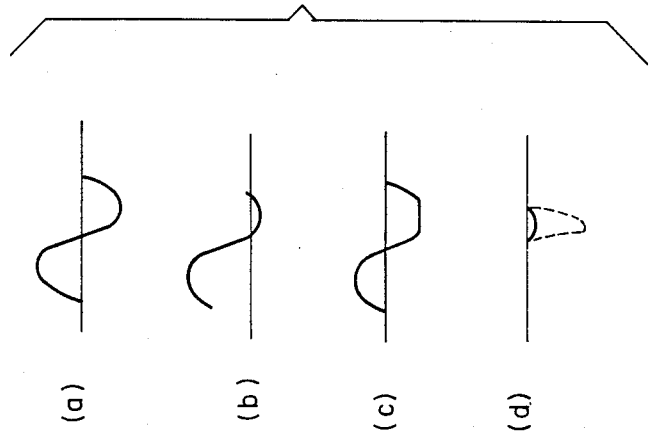
FIG. 4 is a waveform diagram illustrating signals appearing in certain portions of the apparatus of FIG. 2.

The operation of the circuit of FIG. 2 can be more easily understood by referring to FIG. 4 which shows simplified waveform diagrams of signals appearing at various points in the circuit. FIG. 4(a) shows the signal as it might appear at input terminal 22. FIG. 4(b) illustrates the signal referenced to 0.6 volts below ground level by diode 31. If resistors 32 and 33 are chosen to be equal in value to each other, this divider decreases the voltage amplitude by a factor of 2, providing the resulting signal to amplifier 34. Amplifier 34 reproduces the signal appearing at its input, except for that portion below ground, thereby producing an output which resembles FIG. 4(c), that being the signal reproduced except for that portion lying between the reference level and the adjacent peak of the signal.

Meanwhile, the signal coupled through capacitor 23 and divided by the dividing and bias circuit including resistances 24, 25, and 26 is essentially the signal shown in FIG. 4(a), also reduced in amplitude by the dividing action, supplied to the other input of differential amplifier 27. The resulting signal amplified by differential amplifier 27 is then shown in FIG. 4(d).

It will be observed that various gain relationships can be employed in the circuits and, therefore, no effort has been made to illustrate relative amplitudes between these signals. However, it will be observed that the signal appearing at output terminal 39 of amplifier 17 represents only that peak portion of the signal which represents the difference between the two signals supplied to amplifier 27 and contains sufficient information derived from the signal received from antenna 13 to produce an acoustic signal to establish a regenerative feedback network without permitting amplifier saturation.

As an example, assume that the composite signal provided at terminal 22 can be a maximum of 10 volts (for a system in which V+ is 12 volts) and that the resistive values of resistors 32 and 33 are equal. The output appearing at terminal 39, which produces the difference between the complete signal provided to its non-inverting input and the complete signal absent the 0.3 volt peak portion at its inverting input, will not exceed 0.3 volts if resistors 36 and 38 are also chosen to be equal to each other. If it is understood that the desired signal is "riding" on the larger signal, the result constitutes an overall reduction of the weak signal of about 2:1 because of the reduction by division in resistors 32 and 33, but the reduction of the stronger interfering signal can be as great as 33:1, i.e., 10 volts divided by 0.3 volts. Resistors 36 and 38 can, of course, be chosen to provide further amplification in that stage, if desired.

It will be recognized that this system does not involve any effort to faithfully reproduce all of the information contained in the signal produced by modulator transmitter 12 and antenna 13. Such "high fidelity" is not only not necessary, it is of no consequence whatsoever. It is only necessary to reproduce a single form of signal which can be regenerated through the loop. Because of the broad-band nature of the detector, such response is substantially instantaneous, providing the desirable advantage of quickly establishing the regenerative feedback loop before the eavesdropping transmitter can be deactivated.

Figure 3:
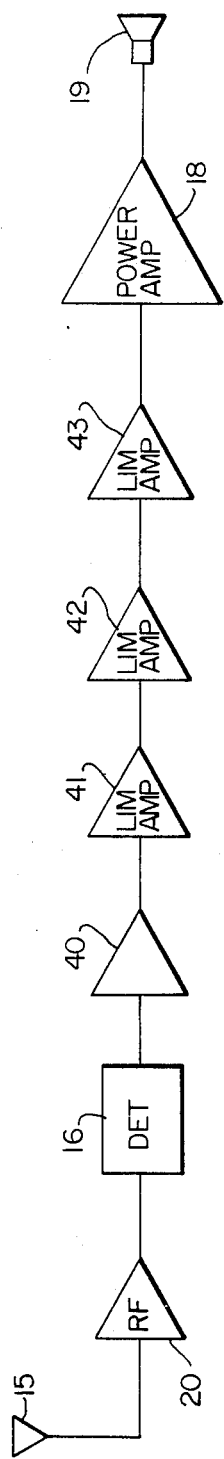
FIG. 3 is a schematic diagram, in block form, of a system according to the invention incorporating multiple limiting amplifier stages.

A multi-stage system to more effectively accomplish the signal selection function is shown in FIG. 3. In that figure, the antenna, RF amplifier, detector, audio or power amplifier, and loudspeaker are the same as those indicated in FIGS. 1 and 2, and are identified by the same reference numerals. The demodulated signal from detector 16 can be amplified by a factor of 60 for a 36 db gain in a broad-band amplifier 40, the resulting signal being supplied to a first limiting amplifier stage 41. In this stage, the ratio of resistors 36 and 38 can be chosen to result in a 20 db gain, the resulting limited signal being subjected to further limiting in a second limiting amplifier stage 42. This stage again provides 20 db of gain, the amplified and limited signal being coupled to a third limiting amplifier stage 43 in which the signal can be reduced to be sure that the power amplification stage does not overdrive. A suitable power amplifier can provide 26 db of power gain to drive the speaker.

It will be apparent that this degree of limiting-amplification may not be necessary under certain circumstances. Accordingly, the limiting function can be removed when it is not needed. Referring again to FIG. 2, switch 37 allows the selection of either the output of amplifier 34 or circuit ground as the input to the inverting input of amplifier 27. When the switch connects to the output of amplifier 34, the system performs as a limiter-amplifier, as previously described. When the switch connects to circuit ground, amplifier 27 operates as a normal operational amplifier, without limiting, and amplifies the total signal presented at its non-inverting input. The system can be provided with indicators to inform the operator when subsequent stages are in or are approaching saturation, and switch 37 can be switched to the limiting mode to prevent saturation.

Because of the multiplying effect of the limiting action of these stages, regeneration can be produced in situations where the ratio of the power of the adverse signal to the desired signal is several thousand to one.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for determining the presence of an eavesdropping device by establishing a regenerative feedback loop with the device, the device being of a type having a transducer responsive to acoustic signals, means for modulating a carrier signal with the transduced acoustic signals, and means for transmitting the modulated signals in the form of low power electromagnetic signals, the apparatus being usable in an environment subject to other electromagnetic signals of greater power, and comprising antenna means for receiving electromagnetic signals;

broad-band detector means for demodulating signals received by said antenna means;

circuit means including amplifier circuit means for selecting and amplifying only peak portions of the transduced acoustic signals demodulated by said detector means; and transducer means for converting said peak portions, after amplification, into acoustic signals and for propagating said acoustic signals for reception by the eavesdropping device to establish a regenerative loop, the presence of said device being manifested by a perceptible tone from said transducer means.

2. An apparatus according to claim 1 wherein said amplifier circuit means includes means for establishing a reference level for said demodulated signal at a predetermined voltage difference from one peak of said signal;

means for amplifying said demodulated signal except that portion between said reference level and said peak;

a differential amplifier;

first circuit means for coupling the amplified portion of said demodulated signal to one input of said differential amplifier; and second circuit means for coupling the full demodulated signal to the other input of said differential amplifier, whereby said differential amplifier amplifies the portion of said demodulated signal between said reference level and said peak.

3. An apparatus according to claim 2 wherein said means for establishing a reference level includes a series capacitor;

a diode having a predetermined voltage drop connected between said capacitor and ground; and voltage divider circuit means connected in parallel circuit relationship with said diode.

4. An apparatus according to claim 3 wherein said means for amplifying comprises an operational amplifier having an input terminal connected to intermediate point on said divider circuit means.

5. An apparatus according to claim 1 wherein said amplifier circuit means includes a plurality of limiteramplifier stages connected in cascade, each of said stages comprising means for establishing a reference level for said demodulated signal at a predetermined voltage difference from one peak of said signal;

means for amplifying said demodulated signal except that portion between said reference level and said peak;

a differential amplifier;

first circuit means for coupling the amplified portion of said demodulated signal to one input of said differential amplifier; and second circuit means for coupling the full demodulated signal to the other input of said differential amplifier, whereby said differential amplifier amplifies the portion of said signal between said reference level and said peak.

6. An apparatus according to claim 5 and further comprising bypass switch means connected in parallel circuit relationship with at least one of said stages for selectively shunting said stage.

* * * * *